(12) United States Patent
Miller et al.

(10) Patent No.: US 10,148,103 B2
(45) Date of Patent: *Dec. 4, 2018

(54) MULTI-FUNCTIONAL HIGH CAPACITY PORTABLE POWER CHARGER

(71) Applicant: Halo International SEZC Ltd., Georgetown, Grand Cayman (KY)

(72) Inventors: Garold C. Miller, Hartford, CT (US); Nathan Daniel Weinstein, Hartford, CT (US)

(73) Assignee: Halo International SEZC Ltd., Georgetown (KY)

(*) Notice: Subject to any disclaimer, the term of this patent is extended or adjusted under 35 U.S.C. 154(b) by 0 days.

This patent is subject to a terminal disclaimer.

(21) Appl. No.: 15/791,671

(22) Filed: Oct. 24, 2017

(65) Prior Publication Data

US 2018/0048168 A1 Feb. 15, 2018

Related U.S. Application Data

(63) Continuation of application No. 14/848,623, filed on Sep. 9, 2015, now Pat. No. 9,819,204.

(60) Provisional application No. 62/047,884, filed on Sep. 9, 2014.

(51) Int. Cl.
*H02J 7/14* (2006.01)
*H02J 7/00* (2006.01)
*G06F 1/26* (2006.01)

(52) U.S. Cl.
CPC .............. *H02J 7/0031* (2013.01); *G06F 1/26* (2013.01); *G06F 1/263* (2013.01); *H02J 7/007* (2013.01); *H02J 7/0021* (2013.01); *H02J 7/0054* (2013.01); *H02J 2007/0062* (2013.01)

(58) Field of Classification Search
CPC ........ H02J 7/0031; H02J 7/0021; H02J 7/007; H02J 7/0054; H02J 2007/0062; G06F 1/263; G06F 1/26
See application file for complete search history.

(56) References Cited

U.S. PATENT DOCUMENTS

| 9,007,015 | B1 * | 4/2015 | Nook | H02J 7/0054 307/150 |
|---|---|---|---|---|
| D730,280 | S | 5/2015 | Koebler | |
| D735,403 | S | 7/2015 | Che | |
| D770,976 | S | 11/2016 | Xu | |
| 2008/0169044 | A1 * | 7/2008 | Osborne | A61J 1/2096 141/1 |
| 2009/0042460 | A1 * | 2/2009 | Schey | B63H 21/213 440/2 |

(Continued)

FOREIGN PATENT DOCUMENTS

CN 203707839 U 7/2014

*Primary Examiner* — Nha Nguyen
(74) *Attorney, Agent, or Firm* — McCormick, Paulding & Huber LLP (57) ABSTRACT

A portable charger is capable of jump starting a 12V car battery as well as charging 5V portable electronic devices. The charger includes a charger battery; a power supply operatively connected with the charger battery; at least one USB output jack operatively connected with the power supply for providing +5V USB power; and positive and negative jumper cable jacks operatively connected with the power supply for providing +12 V DC power to jump start a vehicle battery.

18 Claims, 7 Drawing Sheets

(56) References Cited

U.S. PATENT DOCUMENTS

| | | | |
|---|---|---|---|
| 2013/0026709 A1* | 1/2013 | Sampson | A63F 1/12 273/149 R |
| 2013/0154543 A1* | 6/2013 | Richardson | H02J 7/007 320/104 |
| 2014/0159509 A1 | 6/2014 | Inskeep | |
| 2015/0054336 A1* | 2/2015 | Xinfang | B60R 16/033 307/9.1 |

* cited by examiner

MULTI-FUNCTIONAL HIGH CAPACITY PORTABLE POWER CHARGER

CROSS REFERENCE TO RELATED APPLICATIONS

This application is a continuation of and claims the benefit of U.S. patent application Ser. No. 14/848,623, filed Sep. 9, 2015, which claims priority to U.S. Provisional Patent Application No. 62/047,884, filed Sep. 9, 2014, each of which are incorporated herein by reference in their entirety.

BACKGROUND

Technical Field

The present invention generally relates to power charging devices, and more particularly relates to a multi-functional, portable power charger with high power capacity usable for charging portable electronic devices, laptop computers and jump starting car batteries when a standard external power source is not convenient.

Discussion of Art

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, even when the device is connected to an external power source for recharging, it is difficult to continue using the device, as the device needs to remain tethered to the power source.

Similarly, a separate charging cable is usually required for connecting an electronic device with a particular power source. For example, a consumer will have one cable for charging a phone at home with an AC wall socket, and another cable for charging the phone in the car using the DC car charging socket, and perhaps additional cables for charging the phone using a computer or on an airplane. Moreover, different electronic devices often utilize different connection ports and interfaces such that a single charging cable is not compatible with multiple devices. Accordingly, a tech-savvy consumer, with several electronic devices, will usually have multiple charging cables to keep track of, and find a place to store each applicable charging cable when on the move.

Even then, the consumer may be without sufficient power to recharge a phone due to bad weather or a power outage, or may not always be in a place where a power source is readily available, or even if so, may not have the appropriate cable or adapter available to use with a particular power source. Furthermore, the consumer may not always be in a place where a power source is readily available, for example, if they are at the park, or may not have the appropriate cable or adapter available to use with a particular power source, for example, they are in the office but left their charging cable at home, or may be without sufficient power to recharge a phone or other device due to bad weather or a power outage.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable with her at the time. As noted, if the phone is plugged into a traditional power source, like a wall socket, it is difficult to continue using the phone as desired. Accordingly, what is needed is a power charger, even with a small boost of power, that is as portable as the electronic device and preferably easy to carry with the electronic device and the appropriate charging cable, and thus easily usable on-the-go.

Further, portable power chargers designed for use on-the-go must be suitable to a variety of conditions, as they are often most in need where a standard external power source is not available, and thus often needed when there is no power at all. For example, a portable power charger is especially useful when walking, camping, at the park, at the mall, or at a sporting event, where one may need to use a phone in an emergency situation. In such situations, the user doesn't want to have to carry too many objects, and this may not be able to carry a large power charger, even if portable, and one or more charging cables in addition to an electronic device (e.g., smart phone). Accordingly, a portable power charger that is easy to carry around without taking up too much space is desirable.

Still further, numerous portable power chargers are currently available on the market having a variety of shapes, sizes and designs. Commonly, however such power chargers have a limited battery capacity, and are therefore limited in what can be charged and how much charge can be provided. Typically, such portable battery chargers are designed for simply charging portable electronic devices, such as smart phones, portable music players, and possibly tablets. Few portable battery chargers are available for recharging laptop computers, as they commonly have insufficient power capacity in their own internal battery. Even fewer portable battery chargers are available for jump-starting car batteries, and those that are available on the market either are too big to transport in one's pocket, purse or bag, or simply cannot provide a sufficient amount of power to adequately jumpstart and recharge a car battery.

Regarding car battery chargers on the market, such devices typically are not also usable for recharging portable electronic devices and laptop computers.

In view of the foregoing, there is a need for a portable charger that can be used to charge a car battery, laptop computers and variety of portable electronic devices, including but not limited to smart phones, mobile phones, data tablets, music players, cameras, camcorders, gaming units, e-books, Bluetooth headsets and earpieces, GPS devices, and the like, either individually or simultaneously in various combinations, while still being easily portable itself. Accordingly, there is a need for such a charger that has high charge capacity—i.e., on the order of 10,000 to 15,000 mAh—while still being portable, of a compact size, and easy to use in various conditions and locations to charge a car battery, charge a computer, and charge one or more electronic devices simultaneously, including but not limited to in a house or office, a car or an airplane, as well as on-the-go, without compromising operation, performance or appearance. Still further, there is a need for a portable charger that can be easily recharged from an external power source, providing increase flexibility and convenience of use for the portable charger. Accordingly, it is a general object of the present invention to provide a portable charger that improves upon conventional power chargers currently on the market, especially car battery chargers, and that overcomes the problems and drawbacks associated with such prior art chargers.

SUMMARY OF INVENTION

In accordance with the present invention, a lightweight portable charger is provided for charging various devices, including jump starting a car battery, charging laptop computers and a variety of electronic devices, including but not limited to smart phones, mobile phones, data tablets, music players, cameras, camcorders, gaming units, e-books, Bluetooth headsets and earpieces, GPS devices, and the like, either individually or simultaneously in various combinations. In general, such a portable charger includes an internal rechargeable battery unit for connecting to and recharging one or more device in need of a power boost, as necessary, and at least one power connection port for connecting the charger unit with at least one such device, or an external power source, or both.

Additionally, the portable charger may include one or more power connection ports that can act as power inputs, power outputs, or both, so as to be used for recharging the internal battery from an external power source connected to the charger via a connection port, or charge electronic devices connected to the charger via a connection port. The portable charger may further be connected to an external power source and one or more electronic device at the same time, even using the same power connection port, without affecting operation of the charger to receive a charge from the external power source or supply a charge to the electronic devices.

In preferred embodiments of the present invention, the power charger is provided with a USB connection port, a DC connection port, and an ignition connection port. The USB connection port can act as a power output and is used for connecting the power charger with electronic devices and/or external power sources using appropriate charging cables and adapter units, as needed. In certain embodiments, multiple USB ports may be provided. Additionally, though shown and described as USB ports, the ports may use other known connection interfaces, such as micro-USB, mini-USB, Apple Lightning™, Apple 30-pin, or the like, without departing from the spirit and principles of the present invention.

The DC connection port can act as a power input, is used for connecting the power charger with external power sources using appropriate charging cables with AC/DC adapters, as needed. In an embodiment of the present invention, a separate DC input and DC output may be provided.

The ignition connection port is provided to connect the portable battery charger to a car battery for jump starting using jumper cables with positive and negative alligator clips inserted into the port. A specially designed end cap is provided on the end of the jumper cables to mate with the socket of the ignition port.

Power chargers in accordance with the designs described and illustrated herein are readily portable as a result of the small, compact size of the charger housing. Despite the small size of the power charger, the power capacity is very high so that the battery unit can accommodate a variety of devices in need of recharging, including multiple devices at the same time, if necessary. In preferred embodiments, the battery unit comprises a rechargeable Lithium-Ion battery having a power capacity in the range of about 57,165 mWh to about 57,720 mWh. Such power capacity allows the portable charger to also be used to charge portable electronic devices. Moreover, such a power capacity level makes the present invention especially suitable for jump-starting a car battery.

The portable power charger also includes an emergency floodlight, controlled by a power switch on the charger housing.

The portable power charger also includes a power indicator that will indicate the remaining capacity of the internal rechargeable battery unit in the power charger. For example, in an embodiment of the present invention, the power indicator means comprises a series of four LED lights, but can include more or fewer lights without departing from the principles and spirit of the present invention. When the battery is at "full" capacity—i.e., electric quantity between about 76% and about 100%—all the lights will be lit up. As the battery power decreases, the lights will correspondingly decrease by one as the power is used—e.g., three lights indicates electric quantity between about 51% and about 75%; two lights indicates electric quantity between about 26% and about 50%; and one light indicates electric quantity less than or equal to about 25%. Alternatively, the power indicator means can comprise a digital interface that provides a battery capacity level for the internal rechargeable battery unit, or another known means of providing battery level information.

The power charger also comprises a controller or microprocessor, including a processing unit, configured to execute instructions and to carry out operations associated with the power charger. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with the power indicator means to provide the user with information for how much capacity is remaining in the internal rechargeable battery unit and whether the charger needs to be connected to an external power source for recharging.

In certain embodiments of the power charger, connector cables operatively communicating with the internal battery unit can be provided with the charger housing, and in some embodiments, storable within cavities formed in the charger housing from which they can be removed to connect to electronic devices in need of a recharge. Still further, such charging cables can be removable and replaceable so that varying connector interfaces—e.g., USB, Micro-USB, mini-USB, Apple Lightning, or Apple 30-pin—can be used with the portable power charger.

In certain embodiments of the power charger, a wireless transmitter and/or receiver can be included in the charger housing for wirelessly recharging the internal batteries of portable electronic devices that have an appropriate wireless receiver or wirelessly recharging the internal battery of the power charger from a wireless recharging station, such as designs shown and described in co-pending U.S. patent application Ser. No. 14/220,524, filed Mar. 20, 2014, and incorporated herein by reference.

Certain exemplary embodiments of the invention, as briefly described above, are illustrated by the following figures.

DETAILED DESCRIPTION

Figure 1:
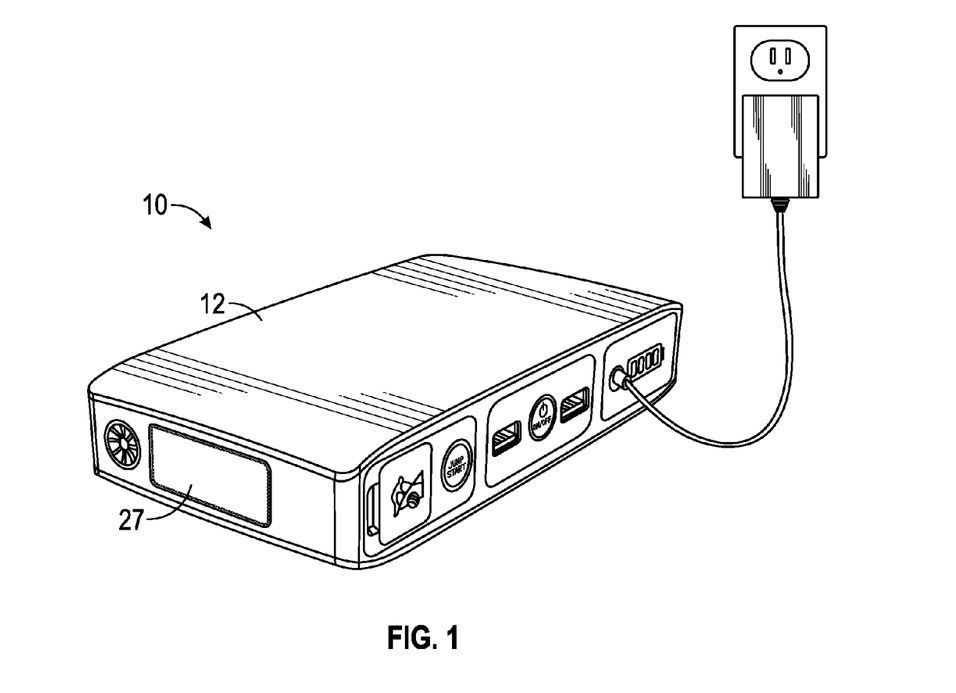
FIG. 1 shows in perspective view a portable charger.
Figure 2:
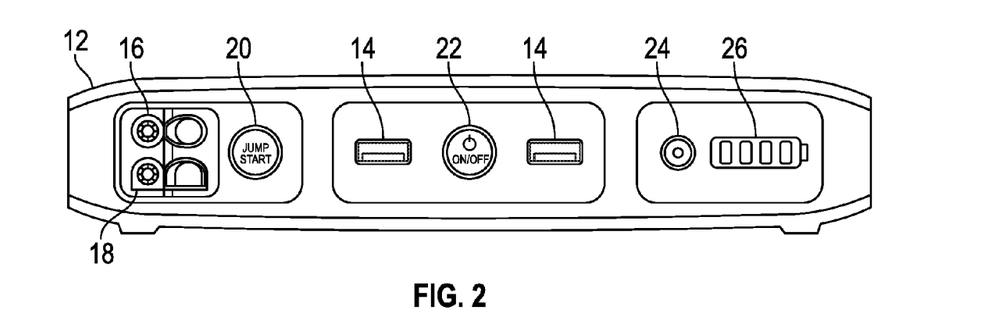
FIG. 2 shows in front view the portable charger of FIG. 1.

FIGS. 1 and 2 show a portable charger 10, which is capable of jump starting a 12V car battery as well as charging 5V portable electronic devices. The portable charger 10 comprises a case 12. At the outside of the case 12 is at least one 5 V USB output jack 14. Also at the outside of the case 12 are differently-shaped positive and negative 12 V jumper cable jacks 16, 18, a jump start button 20, a power button 22, a 19 V DC charging jack 24, battery level indicator LEDs 26, and a lamp 27 (e.g., an LED or fluorescent lamp).

Figure 3:
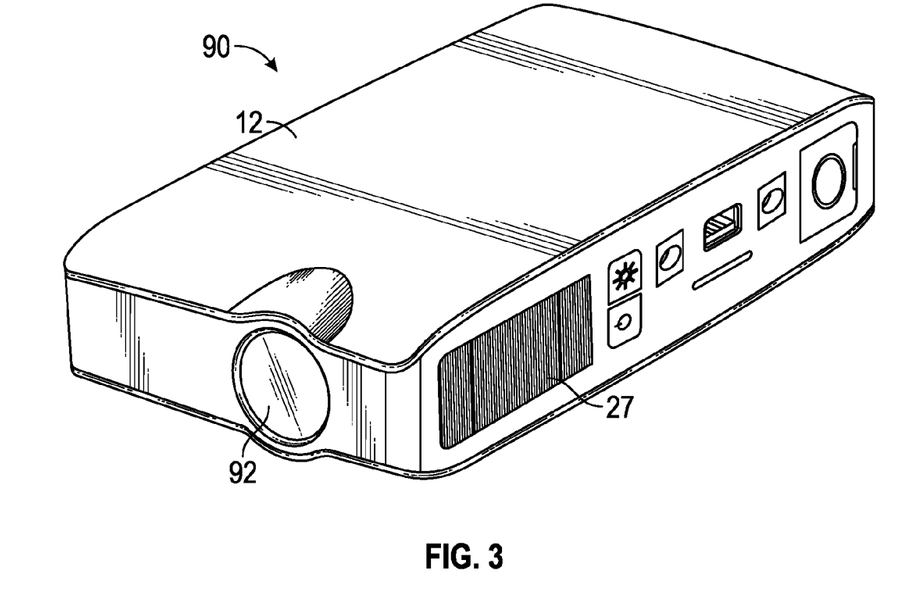
FIG. 3 shows in perspective view a second portable charger.
Figure 4:
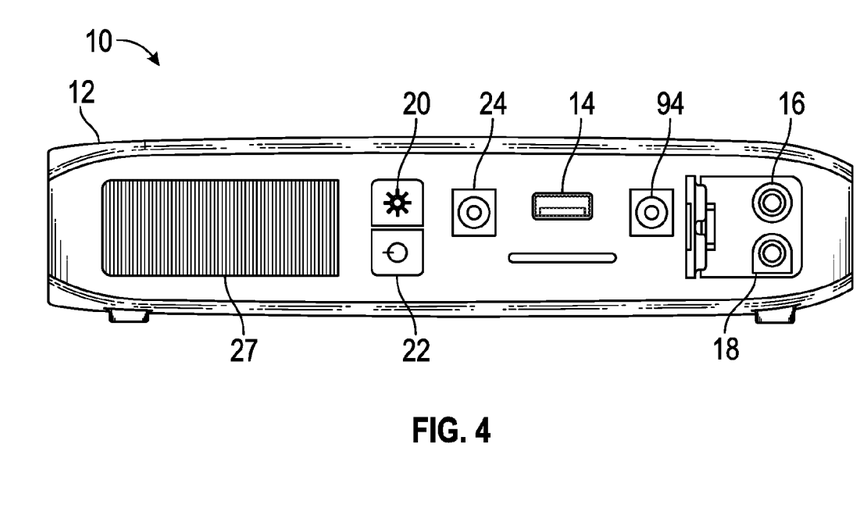
FIG. 4 shows in front view the second portable charger of FIG. 3.

Referring to FIGS. 3-4, in another embodiment a portable charger 90 includes a second lamp 92 (e.g., LED or fluorescent) as well as a DC output jack 94. Other components of the portable charger 90 are similarly numbered to, and similar to, those described with reference to FIGS. 1-2.

Figure 5:
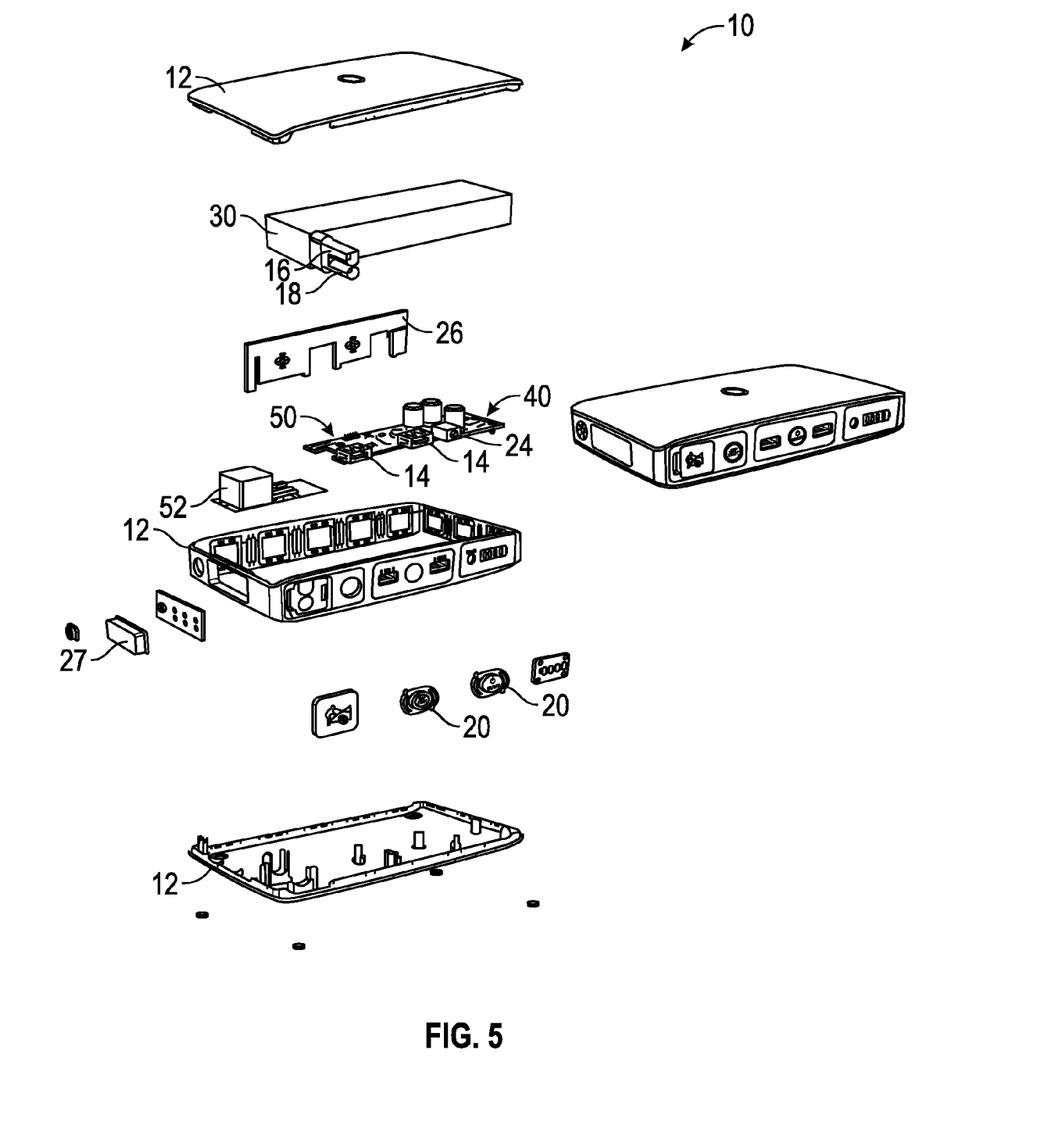
FIG. 5 shows in exploded assembly view the portable charger of FIG. 3.

FIG. 5 shows an exploded assembly view of the portable charger 10. Inside the case 12, the portable charger 10 houses a charger battery 30 (e.g., a lithium ion type battery), a power supply 40 that is operatively connected with at least one terminal of the charger battery 30, with the at least one USB output jack 14 for providing +5V USB power, and with the jumper cable jacks for providing about +12 V DC power, and a safety circuit 50 that operatively connects the power supply 30 with the jumper cable jacks 16, 18. All these components are in common between either of the portable chargers 10 or 90, thus, what is described with reference to FIG. 5 for the portable charger 10 as shown in FIGS. 1-2, applies equally to the portable charger 90 as shown in FIGS. 3-4.

The charger battery 30, in certain embodiments, can be a series-connected three cell lithium ion polymer battery rated at 3.7 V per cell (11.1 V total), capable of 400 A peak current, in excess of 57000 mWh capacity, with charging circuitry to support a charge voltage of 19 V. Such specifications enable the portable charger 10 to be of moderate size, i.e. less than 30 cm along any edge, while also being capable of at least three jump start attempts on a 12 V car battery. The power supply 40 allows up to 400 Amp of peak current to be drawn for jump starting an automotive battery that is connected to a vehicle. Additionally, the power supply 40 provides 5 V DC output to the USB jacks.

Generally, the safety circuit 50 enables operative connection of the jumper cable jacks with the charger battery terminals, in case there is a voltage differential of at least about 11 V across the positive and negative jumper cable jacks. The safety circuit 50 interrupts at least the operative connections of the charger jacks with the charger battery, in case any of the following shut off conditions occurs: insufficient voltage across the positive and negative charger jacks; reverse polarity of the positive and negative charger jacks; reverse current to the charger battery; or excess temperature of the charger battery.

To implement the above-described functionality, the safety circuit 50 initiates a jump start safety check sequence 100 (further described below with reference to FIG. 11) in response to a user actuation of the jump start button 20. Upon successful completion of the jump start safety check sequence, the portable charger 10 provides 12 V DC current from the charger battery 30 to the charger jacks 16, 18. Moreover, upon completion of the jump start safety check sequence the portable charger 10 remains ready to provide 12 V DC current during a pre-determined period of time. For example, during the pre-determined period of time the portable charger 10 provides 12 V DC current from the charger battery 30 to the charger jacks 16, 18 in response to a second user actuation of the jump start button 20. For example, the pre-determined period of time is sufficient for three discrete jump start attempts. According to certain embodiments, the portable charger 10 discontinues readiness after three discrete jump start attempts.

Referring to FIGS. 6-10, the safety circuit 50 comprises a jump start relay 52, a microprocessor 54, a voltage input analyzer 56, a differential voltage amplifier 58, a reverse polarity detector 60, a reverse current protector 62, and a thermistor 64 that are operatively connected with the microprocessor to enable or disable the jump start relay.

More particularly, a port PD1 of the microprocessor 54 is operatively connected to actuate a transistor 66, which energizes or de-energizes the jump start relay 52. The microprocessor 54 also is configured to execute instructions and to carry out operations associated with the power charger. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with the power indicator means 26 in order to display information for how much capacity is remaining in the internal rechargeable battery unit and whether the charger needs to be connected to an external power source for recharging.

Figure 6:
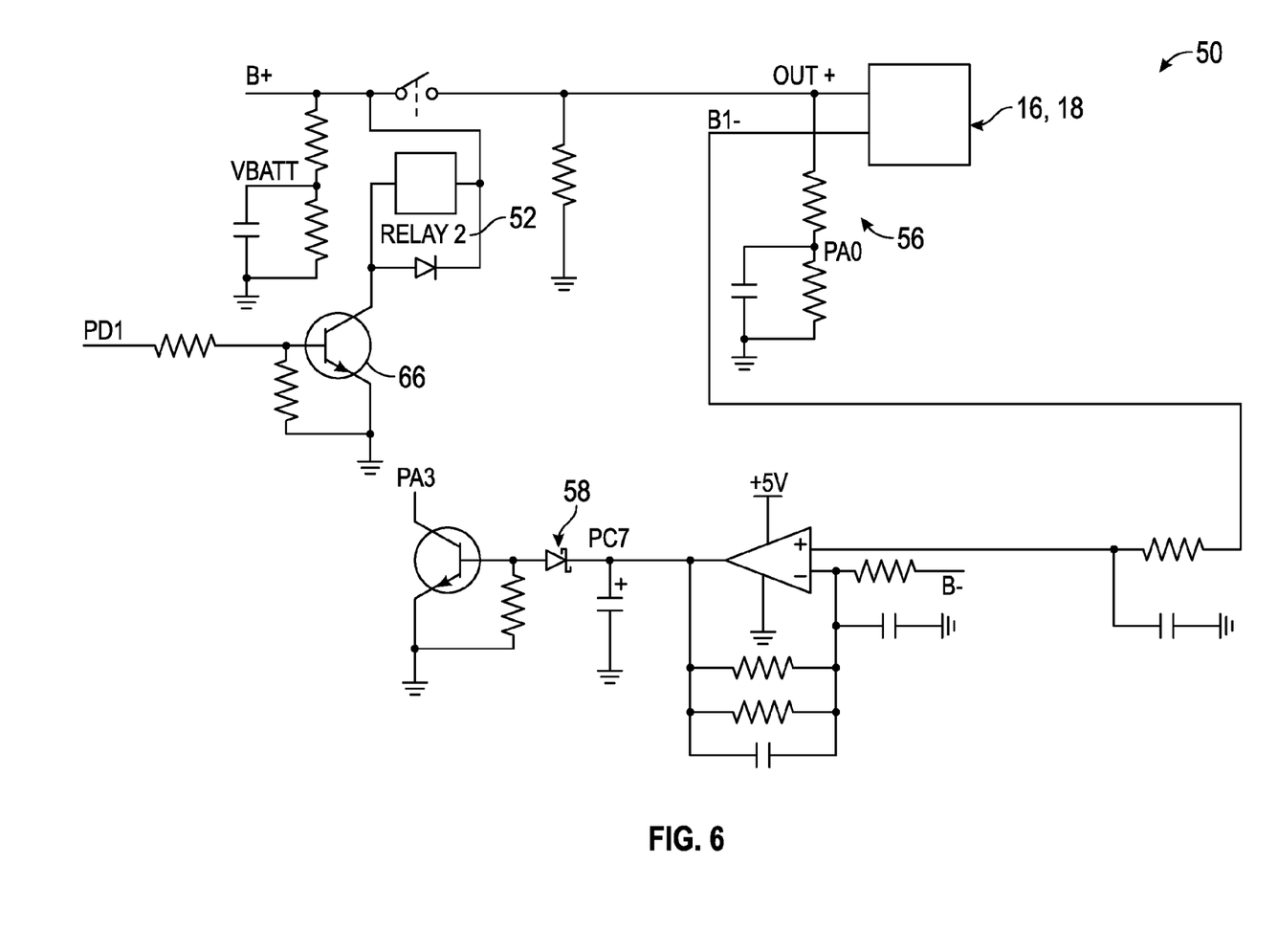
FIG. 6 shows a safety circuit schematic of either portable charger of FIG. 1 or FIG. 3.

FIG. 6 shows the voltage input analyzer 56, which is operatively connected between the jumper cable jacks 16, 18. The voltage input analyzer 56 includes a voltage divider so that it sends to a port PA0 of the microprocessor 54 a fraction of the voltage across the terminals of a vehicle battery to be charged. In case there is a sufficient voltage differential (the jumper cable jacks are connected to a battery), then the fractional voltage from the voltage input analyzer 56 will cancel a default LOW signal at microprocessor port PA0 with the result that the microprocessor 54 will have one of the inputs required in order to energize or enable the jump start relay 52. Thus, the safety circuit 50 can enable the operative connection of the jumper cable jacks 16, 18 to the charger battery 30, only if the charger battery 30 voltage is satisfactory.

FIG. 6 also shows the differential current amplifier 58, which compares the negative terminal voltages of the charger battery 30 and of the vehicle battery to be charged, and sends a HIGH signal to port PC7 of the microprocessor 54 in case the charging current exceeds a tolerance threshold. Moreover, in case the differential current amplifier output exceeds a breakthrough voltage of a Zener diode 68, then the output gates a transistor 70 to cause a LOW signal at port PA3 of the microprocessor 54. These two signals disable the microprocessor from energizing or enabling the jump start relay 52. Thus, the safety circuit 50 can enable the operative connection of the jumper cable jacks 16, 18 to the charger battery 30, only if the negative terminal voltages match within the pre-determined tolerance threshold.

Figure 7:
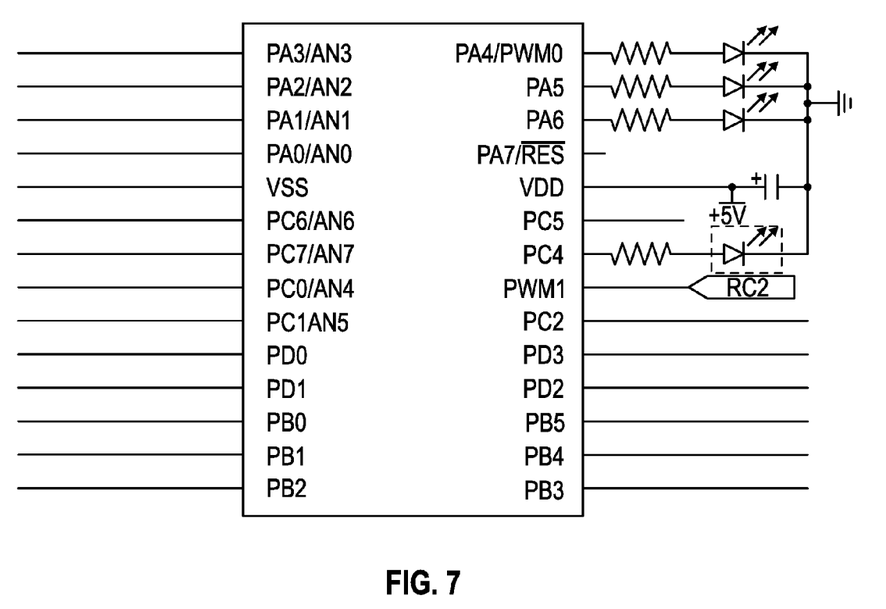
FIG. 7 shows a microprocessor pinout of either portable charger of FIG. 1 or FIG. 3.

FIG. 7 shows the microprocessor 54, which includes the following ports—PA3: ND port battery temperature detection; PA2: A/D port battery voltage detection; PA1: ADI 5V USB current detection; PA0: Out—check external voltage detection; VSS: GND; PC6: V2 charging voltage detection; PC7: V4 battery current output detection; PC0: V5 charging voltage and battery voltage detection; PC1: V3 back to the charging current detection; PD0: on/off port; PD1: relay control port; PB0: reverse battery detection; PB1: LED on/off control; PB2: jump bottom control; PB3: light bottom control; PB4: jump green light control; PB5: jump red light control; PD2: on/off light control; PD3: USB output control; PC2: on/off bottom voltage control; PWM1: PWM signal output; PC4: LED battery indicator control; VDD: VCC; and PA6-PA4: LED battery indicator control.

Figure 8:
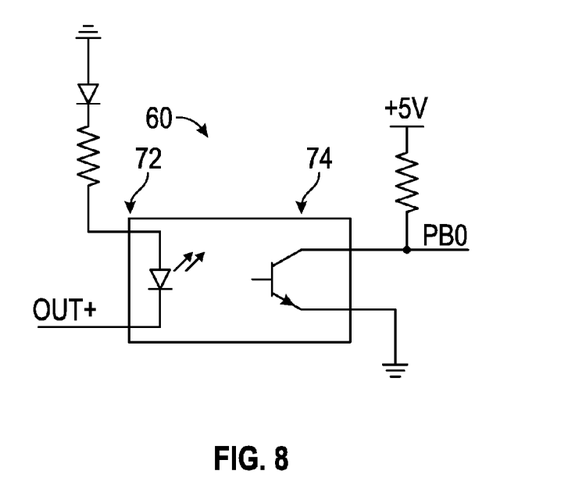
FIG. 8 shows a reverse polarity detector of either portable charger of FIG. 1 or FIG. 3.

FIG. 8 shows the reverse polarity detector 60, which may include a light emitting diode 72 that is connected in electrical series between ground and the positive jumper cable jack 16, and may also include a phototransistor 74 in optical communication with the light emitting diode and connected in electrical series between ground and a reverse polarity detection terminal PB0 of the microprocessor 54. In case the jumper cables are connected backwards, i.e. the positive jumper cable jack is connected to a negative terminal of the vehicle battery to be charged, then reverse polarity will be detected by energization of the light emitting diode 72 and corresponding conduction by the phototransistor 74. This will cause a LOW signal at the microprocessor port PB0, which will cancel the inputs required in order to energize or enable the jump start relay 52. Thus, the safety circuit 50 disables the operative connection of the jumper cable jacks 16, 18 to the charger battery 30, in case the jumper cable jacks are connected backwards to the vehicle battery.

Figure 9:
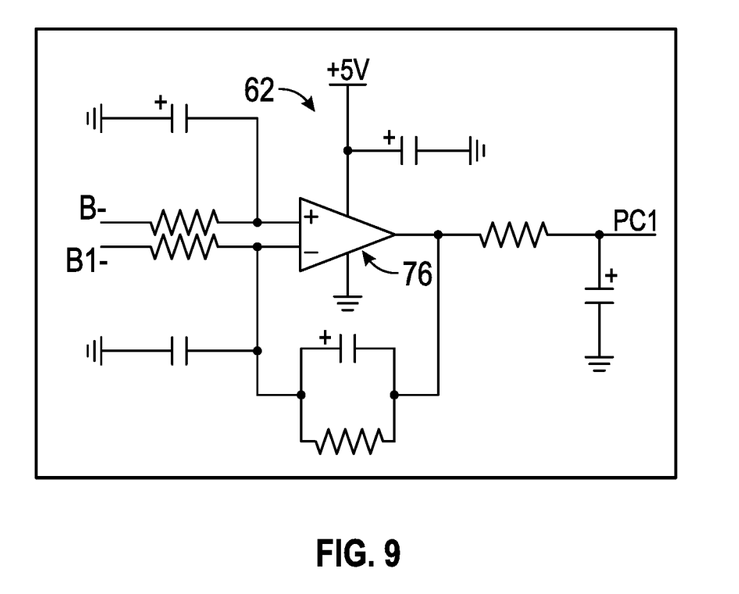
FIG. 9 shows a reverse current protector of either portable charger of FIG. 1 or FIG. 3.

FIG. 9 shows the reverse current protector 62, which may incorporate an operational amplifier 76 operatively connected between the charger battery 30 negative terminal and the negative jumper cable jack 18. In case the voltage differential across the op amp 76 reverses, then the reverse current protector 62 sends a HIGH signal to port PC1 of the microprocessor 54, which will cancel the inputs required in order to energize or enable the jump start relay 52. Thus, the safety circuit 50 disables the operative connection of the jumper cable jacks 16, 18 to the charger battery 30, in case the vehicle battery begins to send current back through the charger battery.

Figure 10:
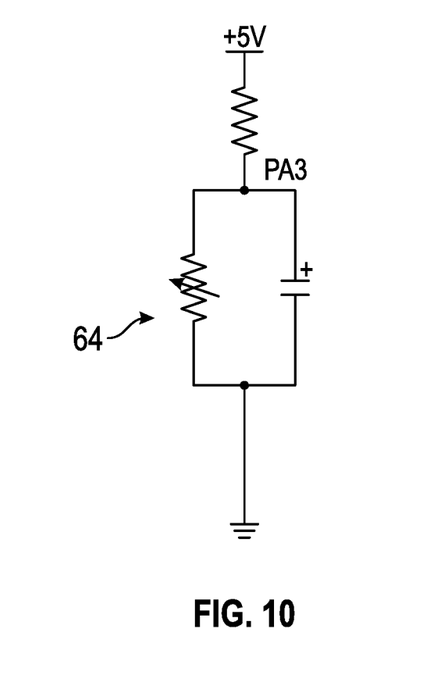
FIG. 10 shows a temperature control circuit of either portable charger of FIG. 1 or FIG. 3.

FIG. 10 shows the thermistor 64 (or equivalent temperature-sensing circuitry) is mounted adjacent the charger battery 30 and is operatively connected with the microprocessor 54 to provide a LOW signal at PA5 in case the charger battery temperature exceeds a pre-determined threshold. Thus, the safety circuit 50 disables the operative connection of the jumper cable jacks 16, 18 to the charger battery 30, in case the charger battery exceeds a pre-determined temperature.

Figure 11:
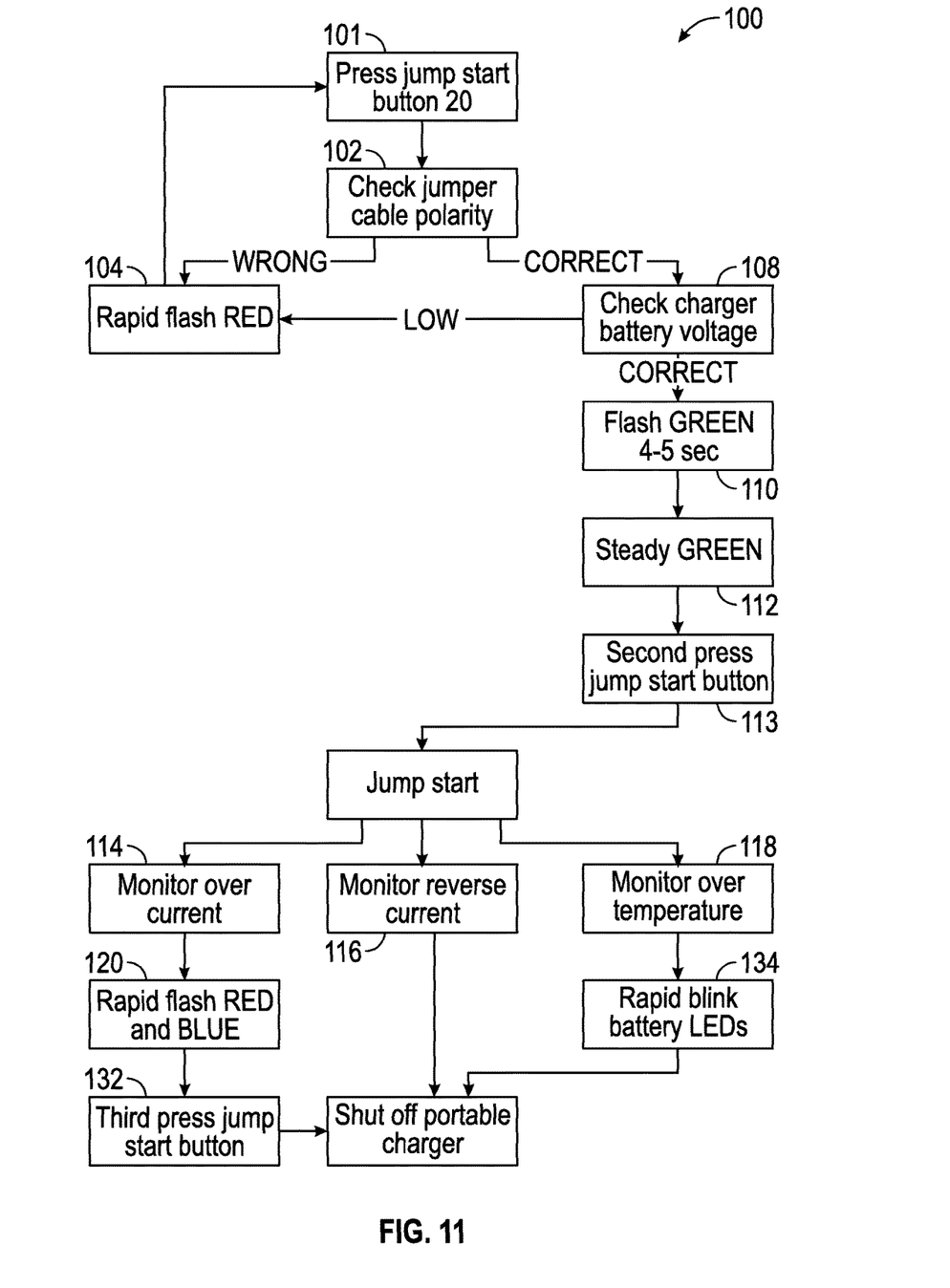
FIG. 11 shows a flowchart of a method of use and operation of either portable charger of FIG. 1 or FIG. 3.

FIG. 11 shows a flowchart of the jump start safety sequence 100. At a step 101, press the jump start button 20 on the portable charger 10. Pressing the jump start button 20 initiates the jump start safety check sequence 100. At step 102, the safety circuit 50 checks jumper cable polarity using the reverse polarity detector 60. The jump start button 20 will rapidly flash 104 RED if cables are not connected correctly. If cables are correctly connected, then the safety circuit 50 will check 108 for adequate charger battery 30 voltage using the voltage input analyzer 56. The voltage input analyzer circuit 56 sends signals to pins PA0, PC5 of the microprocessor 54, which receives the fractional voltage from the charger battery 30 positive terminal in order to assess the voltage differential from the charger battery positive terminal to the negative terminal of the battery that the portable charger 10 will be used to jump start. If a voltage is not detected, the safety circuit 50 will signal the microprocessor 54 to disable the jump start relay 52. On the other hand, if the microprocessor 54 senses at least a minimum voltage differential, it will then enable the jump start relay 52.

Thus, in case charger battery voltage also is satisfactory, then the jump start button 20 will flash 110 GREEN for about 4 seconds if the jump start cables are correctly connected from the jumper cable jacks to the vehicle battery to be charged. Then after 4-5 seconds the portable charger 10 will enter 112 jump start ready state. When the jump start button 20 goes from flashing GREEN to steady GREEN the portable charger is ready to attempt a car start.

The microprocessor 54 will maintain the safety circuit 50 and the portable charger 10 in a state of readiness for jump start during a pre-determined period of time (e.g., up to 5 minutes) in order to allow for multiple attempts to jump start (e.g., at least three attempts). In case a jump start is not attempted before the 5 minutes has elapsed, then the microprocessor 54 will shut down the portable charger 10 by disabling the relay 52. On the other hand, in case a jump start is attempted and the engine fails to start, the microprocessor 54 will permit a pre-determined number of attempts (e.g., total of 3) before turning off the portable charger 10.

From the jump start ready state, charging can be initiated by a second press 113 of the jump start button 20. Once charging has been initiated, the safety circuit 50 continuously monitors 114 for over current using the differential current amplifier 58 and also monitors 116 for reverse current using the reverse current protector 62.

In case the current draw from the charger battery 30 is over 30 A for more than 30 seconds during a jump start, the safety circuit 50 will rapidly flash 120 the jump start button 20 red and the power button 22 blue. Design peak current draw for jump starting, running car lights, accessories, etc. is about 70 A. Therefore, on detecting a successful start, the microprocessor 54 will allow a current draw up to 70 A for up to 4 seconds.

In case the jump start button 20 is indicating a rapid flash RED, then a user can press the jump start button a third time 132 to shut off the portable charger 10. The user then can check cable connections and can press 101 the jump start button again to restart the jump start safety check sequence.

Additionally, the safety circuit 50 monitors 118 for over temperature using the thermistor 64. In case the portable charger senses an over temperature condition of the charger battery 30, all four battery charge level LEDs will blink 134 rapidly for several seconds. The jump start sequence will be disabled until the charger battery 30 has cooled to a safe temperature range, i.e. less than about 65° C.

Thus, embodiments of the invention provide a portable charger that is capable of jump starting a 12V car battery as well as charging 5V portable electronic devices. The portable charger includes a charger battery; a power supply operatively connected with at least one terminal of the charger battery; a safety circuit operatively connected with the power supply; at least one USB output jack operatively connected with the power supply, via the safety circuit, for providing +5V USB power; and positive and negative jumper cable jacks operatively connected with the power supply, via the safety circuit, for providing +12 V DC power to jump start a vehicle battery.

Although exemplary embodiments of the invention have been described with reference to attached drawings, those skilled in the art nevertheless will apprehend variations in form or detail that are consistent with the scope of the invention as defined by the appended claims.

What is claimed is:

1. A portable charger capable of jump starting a 12V car battery as well as charging 5V portable electronic devices, comprising:
   a charger battery;
   a power supply operatively connected with the charger battery;
   at least one USB output jack operatively connected with the power supply for providing +5V USB power;
   positive and negative jumper cable jacks of different shapes and operatively connected with the power supply for providing +12 V DC power to jump start a vehicle battery;
   a safety circuit operatively connected with the power supply for enabling or disabling the jumper cable jacks responsive to sensed conditions;
   a microprocessor configured to interoperate with the safety circuit and to track the capacity level of the charger battery; and
   a jump start button that is pressed to activate the safety circuit in a jump start safety check sequence,
   wherein the jump start button, when pressed, activates the safety circuit to enable or disable a jump start relay for permitting the portable charger to jump start the car battery, and
   wherein the safety circuit provides a first indication when the jumper cable jacks are disabled and a second indication when the jumper cable jacks are enabled,
   wherein the first indication comprises a first light of a first color that is arranged to illuminate the jump start button when the safety circuit disables the jumper cable jacks, and the second indication comprises a second light of a second color that is arranged to illuminate the jump start button when the safety circuit enables the jumper cable jacks.

2. The portable charger of claim 1, further comprising a third indication when the safety circuit is reviewing the sensed condition to determine whether to enable or disable the jumper cable jacks, wherein said third indication comprises illuminating the jump start button as a flashing light in the second color.

3. The portable charger of claim 1, further comprising a power button that is pressed to activate the portable charger for use, and a third light of a third color that is arranged to illuminate the power button, wherein the third light is illuminated steadily while the portable charger is active, and wherein the safety circuit causes the third light to blink in case of an over current condition.

4. The portable charger of claim 1, wherein upon successful completion of the jump start safety check sequence, the portable charger remains ready to provide 12 V DC current during a pre-determined period of time.

5. The portable charger of claim 4, wherein during the pre-determined period of time, the portable charger provides 12 V DC current from the charger battery to the jumper cable jacks in response to a second user actuation of the jump start button.

6. The portable charger of claim 4, wherein the pre-determined period of time is sufficient for three discrete jump start attempts.

7. The portable charger of claim 4, wherein the portable charger discontinues readiness after three discrete jump start attempts.

8. The portable charger of claim 1, wherein the first indication comprises a flashing light when the safety circuit disables the jumper cable jacks, and the second indication comprises a steady light when the safety circuit enables the jumper cable jacks.

9. The portable charger of claim 1, further comprising a power button that is pressed to activate the portable charger for use, and wherein the jump start button is pressed to activate the portable charger for jump starting a vehicle battery.

10. The portable charger of claim 9, wherein the power button is illuminated in a first color when the portable charger is activated for use, and the jump start button is illuminated in a second color when the portable charger is activated for jump starting a vehicle battery.

11. The portable charger of claim 10, wherein the jump start button is illuminated in a third color when a fault condition is detected when the jump start button is pressed.

12. The portable charger of claim 1, further comprising a floodlight.

13. A portable charger capable of jump starting a 12V car battery as well as charging 5V portable electronic devices, comprising:
   a charger battery;
   a power supply operatively connected with the charger battery;
   at least one USB output jack operatively connected with the power supply for providing +5V USB power;
   positive and negative jumper cable jacks of different shapes and operatively connected with the power supply for providing +12 V DC power to jump start a vehicle battery;
   a safety circuit operatively connected with the power supply for enabling or disabling the jumper cable jacks responsive to sensed conditions;
   a microprocessor configured to interoperate with the safety circuit and to track the capacity level of the charger battery;
   at least one indicator light in operative communication with the microprocessor comprising a first jump start light of a first color that is arranged to illuminate the jump start button as a steady light in the first color when the safety circuit enables the jumper cable jacks, and a second jump start light of a second color that is arranged to illuminate the jump start button as a flashing light in the second color when the safety circuit disables the jumper cable jacks; and
   a jump start button that is pressed to activate the safety circuit in a jump start safety check sequence, wherein the jump start button, when pressed, activates the safety circuit to enable or disable a jump start relay for permitting the portable charger to jump start the car battery, and wherein the at least one indicator light illuminates as a steady light when the safety circuit enables the jumper cable jacks, and said at least one indicator light illuminates as a flashing light when the safety circuit disables the jumper cable jacks.

14. The portable charger of claim 13, wherein the jump start button is illuminated as a flashing light in the first color when the safety circuit is reviewing the sensed conditions to determine whether to enable or disable the jumper cable jacks.

15. The portable charger of claim 13, further comprising a power button that is pressed to activate the portable charger for use, and a power indicator light of a third color that is arranged to illuminate the power button, wherein the third light is illuminated steadily while the portable charger is active, and wherein the safety circuit causes the third light to flash in case of an over current condition.

16. The portable charger of claim 13, wherein upon successful completion of the jump start safety check sequence, the portable charger remains ready to provide 12 V DC current during a pre-determined period of time.

17. The portable charger of claim 16, wherein during the pre-determined period of time, the portable charger provides 12 V DC current from the charger battery to the jumper cable jacks in response to a second user actuation of the jump start button.

18. The portable charger of claim 16, wherein the portable charger discontinues readiness after three discrete jump start attempts.

* * * * *